July 6, 1926.
J. H. BOURGON
1,591,153
BODY CONSTRUCTION
Filed August 12, 1925
2 Sheets-Sheet 2
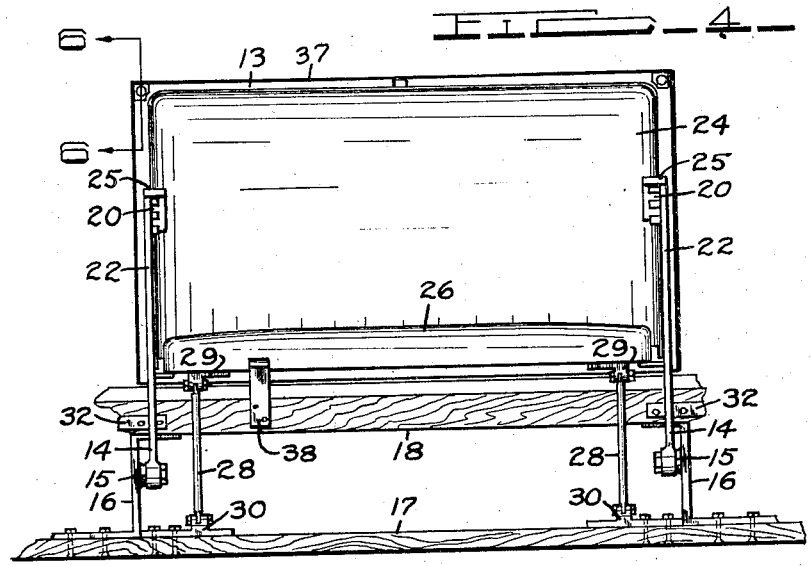
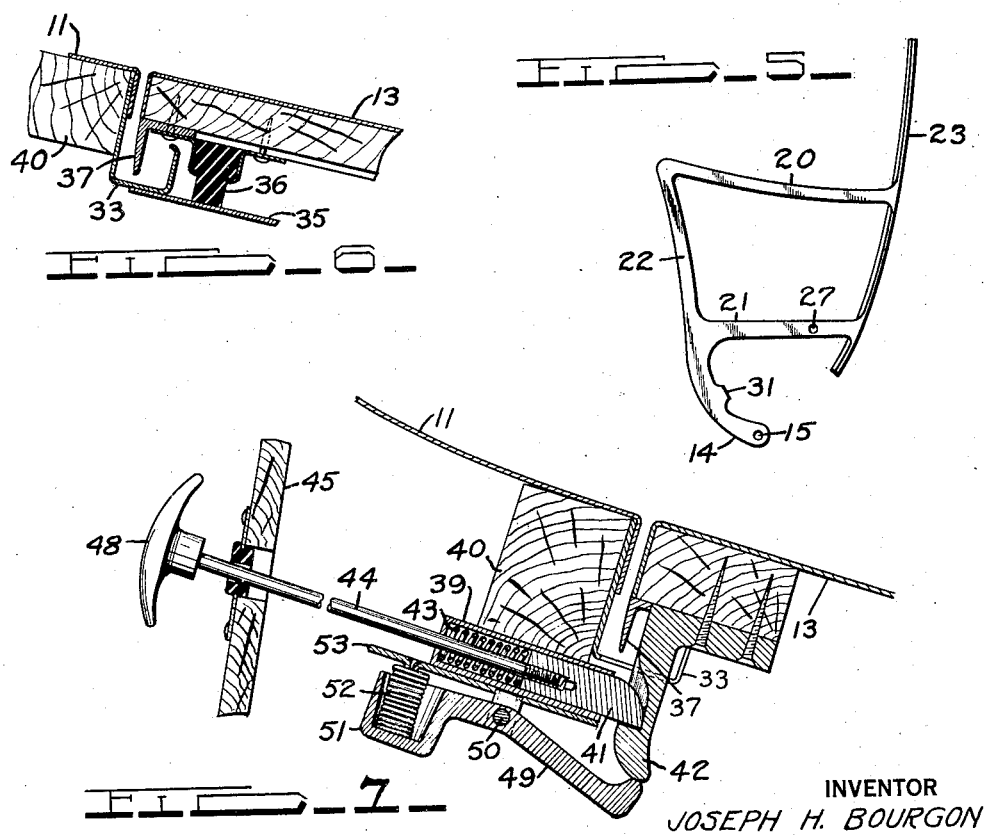
INVENTOR
JOSEPH H. BOURGON
BY
ATTORNEY Patented July 6, 1926.

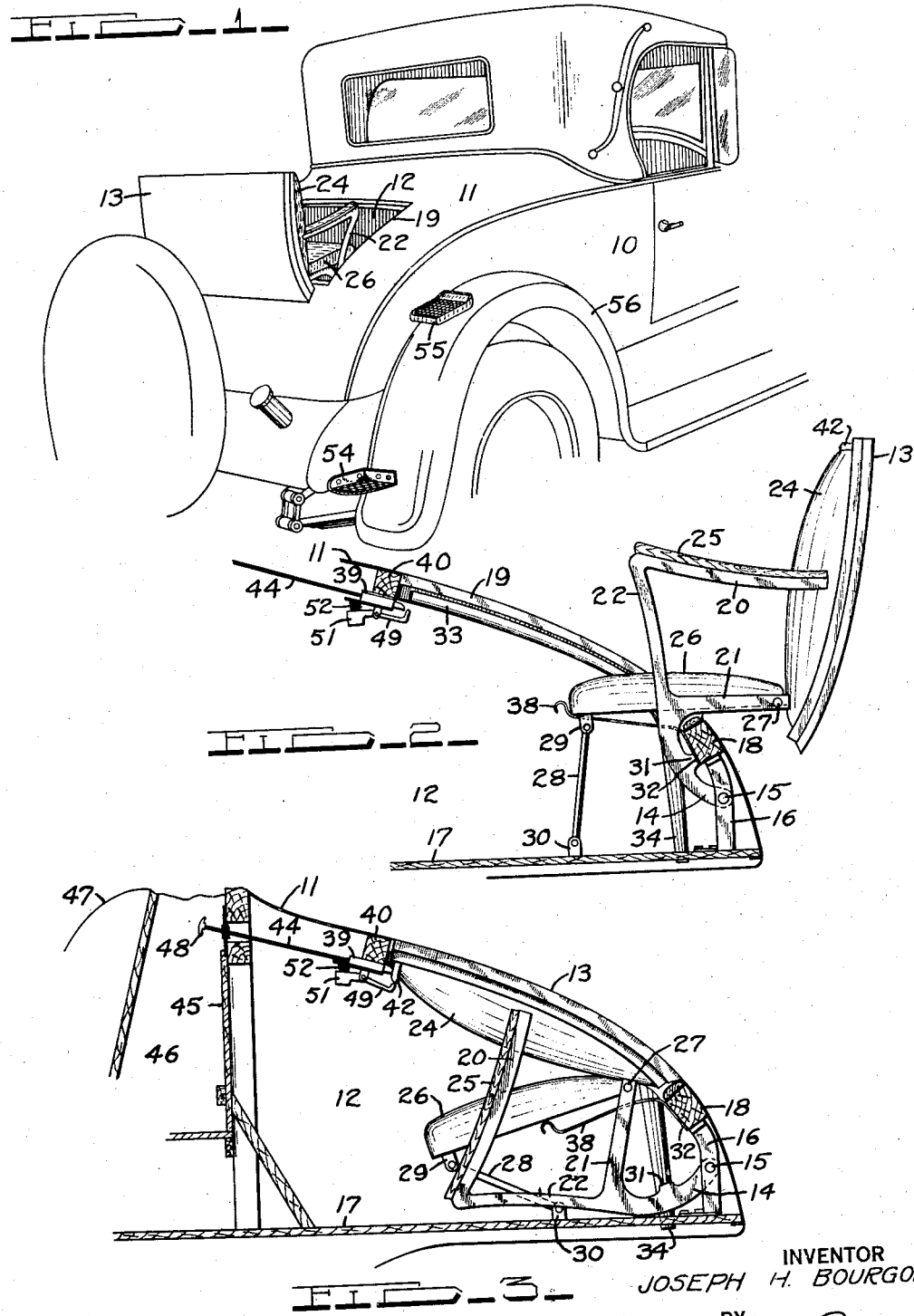

1,591,153

UNITED STATES PATENT OFFICE.

JOSEPH H. BOURGON, OF DETROIT, MICHIGAN, ASSIGNOR TO THE STUDEBAKER CORPORATION, OF SOUTH BEND, INDIANA, A CORPORATION OF NEW JERSEY.

BODY CONSTRUCTION.

Application filed August 12, 1925. Serial No. 49,771.

This invention relates to automobile bodies and particularly to those types, such as roadster and coupé bodies, which have a rear compartment provided with an auxiliary, or as they are often called, a rumble or dickey seat, which, when not in use, are concealed in the rear compartment under the cover or deck.

The principal object of this invention is to provide a new and novel construction in such seats which will, when in open position, extend out over the rear portion of the automobile body, thereby giving more room for the movements of the occupants of such seat than in the conventional constructions.

Another object is to provide such a seat in which the seat arms are rigidly secured to the back portion and do not fold in respect to the back when the latter is folded into inoperative position.

Another object is to provide such a seat composed of two side frame members having seat arms integrally formed therewith, pivotally supported at their lower ends at each side of the automobile body, each frame being provided with an elongated attaching part to which the suitably upholstered cover for the rear compartment is secured to provide a back for the seat; and a seat bottom extending between and pivotally secured and supported at its rear edge to the frame members, the seat being supported at its forward end by suitable legs pivoted at its ends to the seat and to the floor of the body.

A further object is to provide a new and novel means for resiliently holding the seat in open position.

These being among the objects of the present invention, the same consists of certain features of construction and combination of parts to be hereinafter described with reference to the accompanying drawings, and then claimed, having the above and other objects in view.

In the accompanying drawings, which illustrate a suitable embodiment of the present invention, and in which like numerals refer to like parts throughout the several different views:—

Fig. 1 is a three-quarter perspective rear view of a portion of a roadster type of automobile body in which the present invention is incorporated, the seat being shown in open position.

Fig. 2 is a side view of the seat shown in Fig. 1, taken on a line parallel with the length of the automobile and on the line of the near edge of the seat compartment cover, the seat being shown in open position.

Fig. 3 is a view corresponding to the view in Fig. 2, but showing the seat in folded or closed position, and the cover latch means being more completely shown than in the preceding view.

Fig. 4 is a view from the front of the automobile taken on a line immediately in front of the seat in open position, the sides of the body not being shown.

Fig. 5 is a side view of one of the seat side frame members.

Fig. 6 is a section taken as on the line 6—6 of Fig. 4, but in closed position, showing the rubber bumpers employed at the free corners of the cover and the trough means for carrying away any rain or water that may enter the joint between the cover and body.

Fig. 7 is an enlarged sectional view taken longitudinally of and centrally through the cover latch.

In Fig. 1 is shown an automobile body 10 of the roadster type having a rear deck 11 which is typical of this and other types of bodies to which the present invention is applicable. Entrance to the space 12 under the rear deck 11 is gained through a door or cover 13. In view of the limited carrying capacity of such types of bodies an auxiliary seat, or, as it is conventionally called, a rumble or dickey seat, is provided within the rear compartment to meet unusual demands for passenger carrying capacity, and it is in relation to this seat that the present invention is concerned.

The seat in the present invention is supported by two end frames, (see Fig. 5) the lower rearwardly curved ends 14 of which are pivotally supported at 15 on brackets 16 which extend between the floor 17 and rail at the rear edge of the opening 19 leading into the rear compartment or space 12.

Each side frame comprises upper and lower horizontally extending bars 20 and 21 which extend rearwardly from the vertically extending front bar 22 and join the vertically extending rear bar 23 which is shaped to receive and to which is secured the cover 13 which, when provided with suitable upholstery 24, serves as the back to the seat. The upper arm 20 serves as an arm for the seat and is preferably provided with a finishing portion 25 of wood or of suitable upholstery material. The seat bottom 26 is positioned between the two frames and its rear edge is pivoted at 27 to the lower bar 21, and extends forwardly beyond the front bar 22. Its forward edge is supported by vertically extending legs 28 on either side, which are pivotally secured to brackets 29 and 30 secured to the under side of the seat bottom 26 and to the floor respectively. The lower curved leg 14 of each frame is provided with a stop 31 which is adapted to abut against the forward face of the rail 18 when the seat is in open position to limit its backward movement, a strip of steel 32 being provided on the face of the rail to take the wear of the stop 31 thereon.

It will be evident that in the construction shown, when the seat is in open position, very little of it is actually within the limits of the compartment 12, it being constructed to overhang the back of the body and thereby allow practically the entire space 12 to be used for the movements of the occupants of the seat, thereby providing a more comfortable and roomy compartment.

When the seat is swung forwardly to closed position, the frames, together with the cover 13, pivot about the point 15 until the cover 13 drops into the opening 19. The seat bottom 26 simultaneously moves forwardly and downwardly with the frame, pivoting about the point 27 on the frame, while the leg 28 pivots relative to both the seat bottom 26 and floor 17, the front edge of the seat dropping down further than the rear edge to prevent interference between the back upholstery 24 and the seat bottom 26 when in folded position.

As shown best in Figures 2 and 6, the edges and front wall of the opening 19, are provided with a trough shaped upwardly facing moulding 33 having spouts 34 leading from the rear and lower edges of the same to a point below the floor to carry off any rain or water entering the crack or joint between the cover 13 and the rear deck 11, when the cover 13 is closed, to a point outside the body 10. Secured to the underside of the moulding 33 at the forward corners of the opening 19 are plates 35 against which, as shown in Fig. 6, the rubber bumpers 36 secured to the forward corners of the cover 13 are adapted to abut and hold the cover in flush position with the surface of the rear deck 11 when the cover is in closed position. The edges of the cover, as also shown in Fig. 6, are provided with downwardly turned lips 37 which are adapted to be received within the trough 33 when the cover is in closed position, to effect a more complete seal between the cover and the rear deck 11.

In order to overcome the tendency of the seat to move forwardly towards closed position when the brakes of the automobile are suddenly applied, or when pressure is applied to the forward edge of the seat, a flat spring member 38 is provided to hold the seat in open position. The spring 38 is secured at its rear end to the rail 18 and extends forwardly and is bent upwardly to engage the front edge of the seat bottom 26 and is then turned into a roll as shown in Fig. 2. When it is desired to close cover 13, the forward end of the spring 38 is pressed down out of contact with the forward face of the seat bottom 26 and the seat is moved forward, the end of the spring riding against the bottom of the seat bottom 26 while in folded position as shown in Fig. 3, and exerting an increased pressure thereon which tends to keep the parts from rattling.

I will describe briefly the latch mechanism for holding the cover in closed position, it not being necessary to describe the same in minute detail as this mechanism is fully illustrated and described in my co-pending application filed March 12, 1925, Serial No. 15,110.

The cover 13, and consequently the seat, is held in closed position by a latch best shown in Figures 3 and 7, which comprises a casing 39 secured to the underside of the rail 40 at the front edge of the opening 19, in which a latch bolt 41 is slidably retained to engage the keeper 42 secured to the forward edge of the cover 13. The bolt 41 is backed by a spring 43 which tends to hold it in projected position and is withdrawn out of engagement with the keeper 42 against the pressure of the spring 43 by means of a rod 44 which is threaded into the bolt 41. The rod 44 extends forwardly from the bolt 41 through the partition 45 and into the package carrying space 46 behind the front seat 47, where it is provided with a pull handle 48 by means of which the bolt 41 may be retracted from the keeper 42 from the front seat. In order to give the cover 13 an initial opening movement and to make it unnecessary to hold the bolt 41 in retracted position until the cover is swung open, a lever 49 is pivoted at 50 to the underside of the casing 39, its rearwardly extending end abutting against the lower edge of the keeper 42 when the cover 13 is in closed position, and its forwardly extending end being provided with a cup 51 in which is positioned a coil spring 52 normally under compression between the bottom of the cup 51 and a plate 53 secured to the lower face of the casing 39. The spring 52 tends to force the cup 51 down, and consequently the opposite end of the lever 49 up, thereby tending to raise the forward edge of the cover 13, and also holding the bolt 41 in spring pressed relation with the keeper 42, thus preventing rattling of these parts. On retraction of the bolt 41 by the handle 48, the lever 49 forces the forward edge of the cover 13 open far enough to be grasped by the hand, and also carries the keeper 42 out of operative engagement with the bolt 41. Upon closing the cover 13, the parts will resume the position indicated in Fig. 7 as will be readily apparent.

To assist passengers in reaching the seat, step-plates such as 54 and 55 are secured either to the fender 56, or to both the fender 56 and the side of the body 10.

Formal changes may be made in the specific embodiment of the invention described without departing from the spirit and substance of the broad invention, the scope of which is commensurate with the appended claims.

What I claim is:—

1. In combination with an automobile body having a rear deck opening and a cover therefor, means for pivotally supporting said cover on said body comprising two side frame members pivotally connected to said body below and rearwardly of the rear edge of said opening, a seat bottom pivoted at its rear edge to said frame members, and a pivoted leg supporting the forward edge of said bottom whereby when said cover is swung into open position said cover forms a back for said seat bottom.

2. In combination with an automobile body having a rear deck opening and a cover therefor, means for pivotally connecting said cover to said body comprising a pair of frames pivoted to said body within said rear deck which are swingable thereinto and thereoutof in the operation of opening or closing said cover, said frames when said cover is in closed position comprising upper and lower spaced members permanently connected together by spaced bars the forward of which serve as seat arms when said cover is swung to open position, a seat bottom hingedly supported adjacent its rear edge by said frames adjacent said cover, and a pivoted leg pivotally supporting the forward edge of said seat bottom.

3. In combination with an automobile body having a rear deck opening and a cover therefor, means for pivotally connecting said cover to said body comprising a pair of frame members pivoted to said body rearwardly and below the rear edge of said opening whereby when said cover is swung to open position the same lies rearwardly and spaced from the rear edge of said opening, portions of said frames forming arm rests, and a seat bottom hingedly supported adjacent its rear edge to said frames and supported adjacent its forward edge by a pivoted leg, whereby when said cover is swung to open position said seat bottom and cover form a seat and a back therefor.

4. In combination with an automobile body having a rear deck opening and a cover therefor, means for hingedly connecting said cover to said body comprising two frame members pivotally connected to said body below said deck and secured to the normally unexposed face of said cover, said frame members forming sides for a seat and having integral parts thereof forming seat arms, and a seat bottom pivotally supported by said frames and by legs pivotally connected thereto.

5. In combination with an automobile having a rear deck opening and a cover therefor, means for hingedly supporting said cover on said body comprising a frame positioned on each side of said opening, each frame comprising two spaced members connected together by spaced bars, one of said members being secured to said cover and one end of the other member being pivoted to said body below said deck and rearwardly of the rear edge of said opening, one of said bars forming an arm rest, and a seat bottom pivotally supported by said frames and by a pivoted leg.

6. In combination with an automobile having a rear deck opening and a cover therefor, an auxiliary seat for said opening comprising a pair of side supporting members pivoted at one end to said body under said deck and being secured to said cover whereby to hingedly secure said cover to said body and utilize the same as a seat back, a seat bottom hingedly supported adjacent its rear edge to said side supporting members and at its forward edge by a pivoted leg, and an arm rest for said seat formed on said side supporting members.

Signed by me at Detroit, Michigan, U. S. A., this 7th day of August, 1925.

JOSEPH H. BOURGON.